United States Patent [19]

Brogden et al.

[11] Patent Number: 5,734,929
[45] Date of Patent: Mar. 31, 1998

[54] MULTIPLE AS A PHOTOGRAPHIC FILM AND ASSOCIATED CAMERA DEVICE

[76] Inventors: Shona Brogden, 97 Lexington Ave., New York, N.Y. 10016; Robert C. Stirbl, 247 Wadsworth Ave., New York, N.Y. 10033; Peter J. Wilk, 185 W. End Ave., New York, N.Y. 10023

[21] Appl. No.: 312,830

[22] Filed: Sep. 27, 1994

Related U.S. Application Data

[63] Continuation-in-part of Ser. No. 258,239, Jun. 10, 1994, abandoned, which is a continuation-in-part of Ser. No. 98,165, Jul. 28, 1993.

[51] Int. Cl.$^6$ .................... G03B 41/00; G03C 3/00
[52] U.S. Cl. .................... 396/6; 396/322; 396/201; 430/501
[58] Field of Search .................... 354/110, 118, 354/120, 121, 126, 145.1, 219, 465, 195.12; 396/6, 322, 323, 324, 326, 332, 333, 335, 155, 159, 201, 439, 450; 430/495.1, 501

[56] References Cited

U.S. PATENT DOCUMENTS

| | | | |
|---|---|---|---|
| 3,202,069 | 8/1965 | Cummins et al. | 354/120 |
| 3,283,685 | 11/1966 | Cummins | 354/118 |
| 3,558,226 | 1/1971 | Riggs et al. | 354/120 X |
| 3,703,135 | 11/1972 | Lang | 354/120 |
| 3,918,073 | 11/1975 | Henderson et al. | 354/120 |
| 4,023,031 | 5/1977 | Storey | 362/281 |
| 4,145,131 | 3/1979 | Yevick | 354/120 X |
| 4,304,479 | 12/1981 | Van Allen | 354/145.1 |
| 4,527,874 | 7/1985 | Ohmura | 354/195.12 |
| 4,560,261 | 12/1985 | Ueda et al. | 354/121 |
| 4,769,660 | 9/1988 | Heinrich | 354/120 |
| 5,046,833 | 9/1991 | Tsuchida | 359/654 |
| 5,210,557 | 5/1993 | Kameyama et al. | 354/120 |
| 5,218,392 | 6/1993 | Sakamoto et al. | 354/106 |
| 5,222,025 | 6/1993 | Taylor, II | 359/851 X |

*Primary Examiner*—David M. Gray
*Assistant Examiner*—J. K. Han
*Attorney, Agent, or Firm*—R. Neil Sudol; Henry D. Coleman

[57] ABSTRACT

Photographic film comprises a flexible substrate sheet divided on one side into a multiplicity of different picture areas provided with respective layers of photosensitive chemical material having a plurality of different photosensitivities. Thus, each sheet or strip of film is essentially multiple ASA film. Such a film strip is provided with detectible code on a substrate sheet for encoding the photosensitivities of the different picture areas in a readable format. A camera utilizing the film is provided with a magnetic reader for determining film speeds or photosensitivities of the different picture areas on the film. A film transport mechanism is controlled by a microprocessor to move an unexposed picture area of an appropriate ASA to an exposure zone of the camera, either in response to a manually selected ASA or an automatic determination of optimal film speed in accordance with lighting conditions as detected by a light sensor, subject distance, etc. The microprocessor includes a memory for storing in encoded form which picture areas of the film have been exposed.

13 Claims, 9 Drawing Sheets

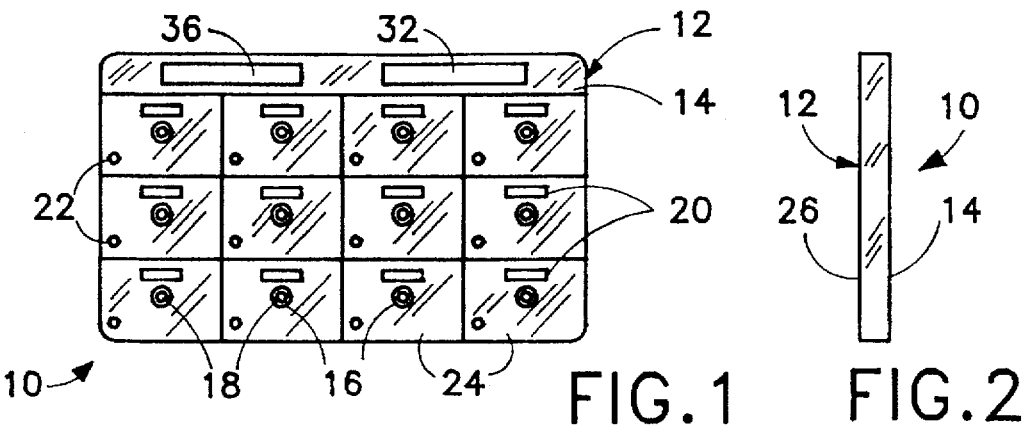
FIG. 1
FIG. 2
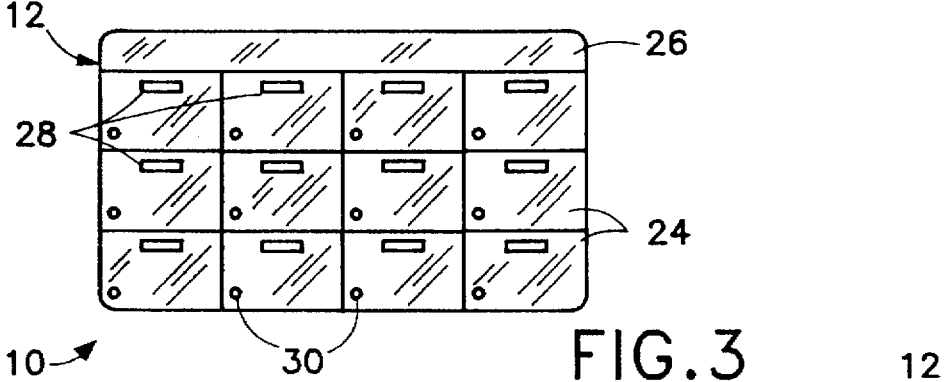
FIG. 3
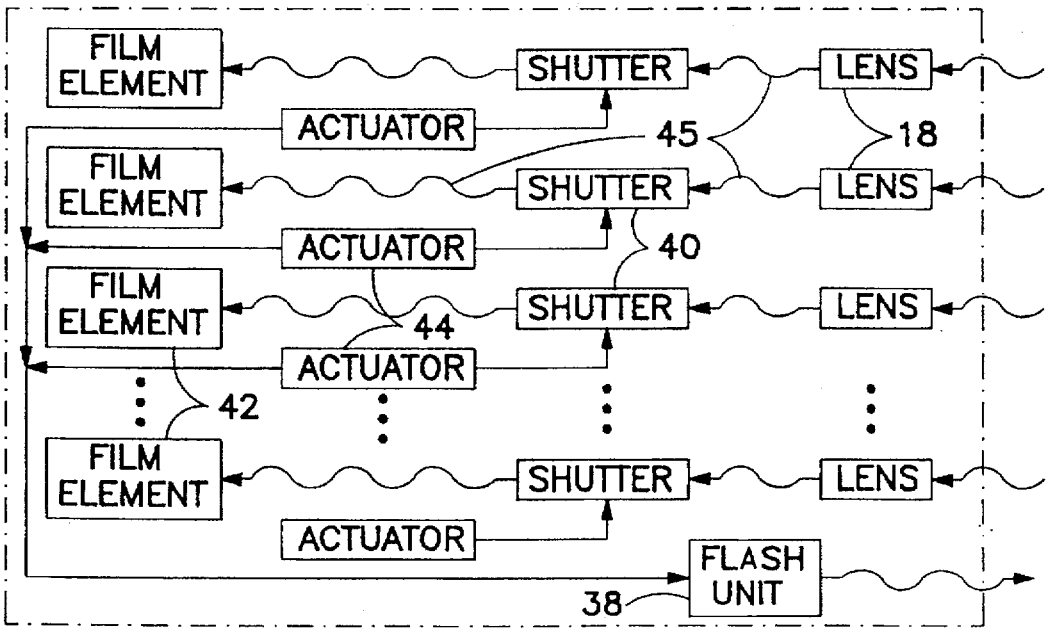
FIG. 4

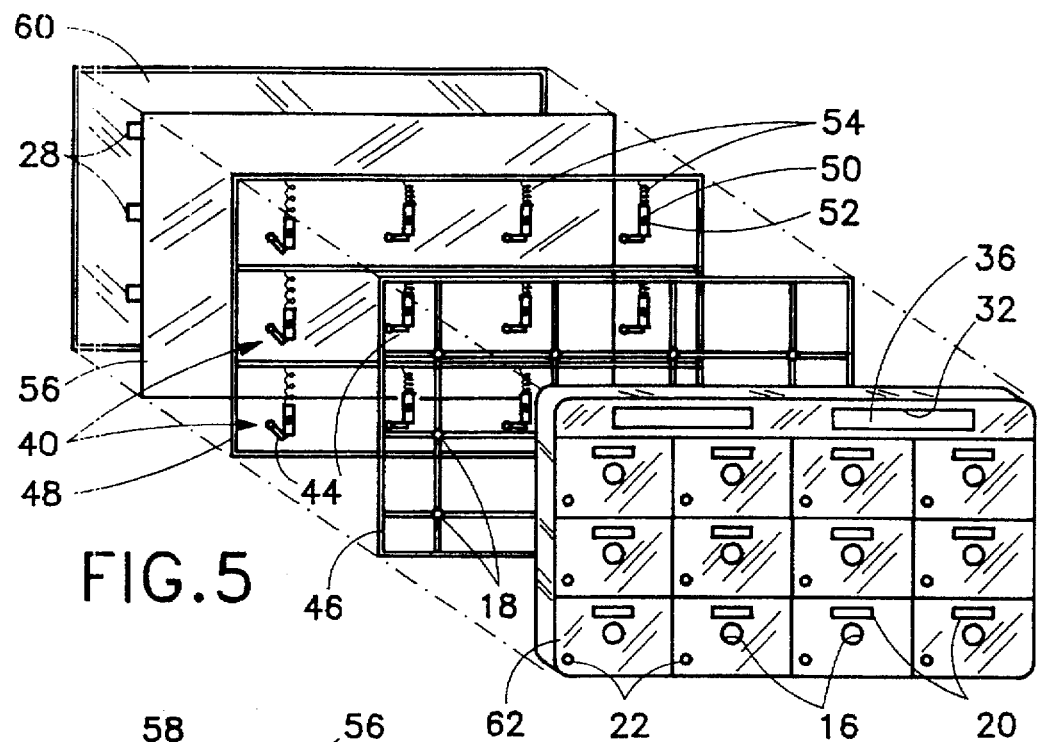

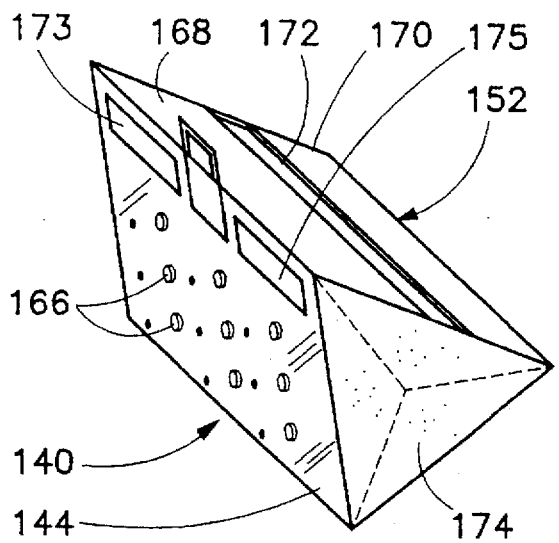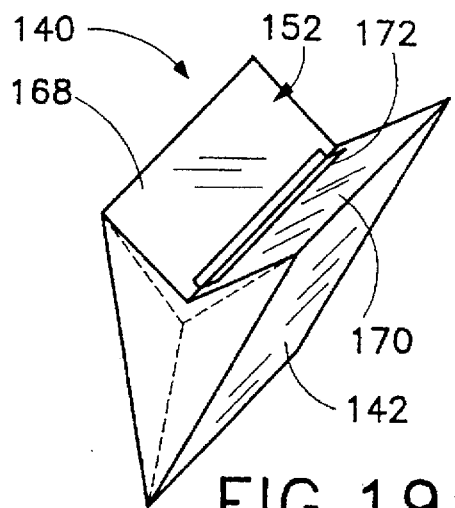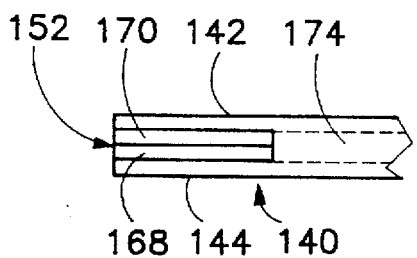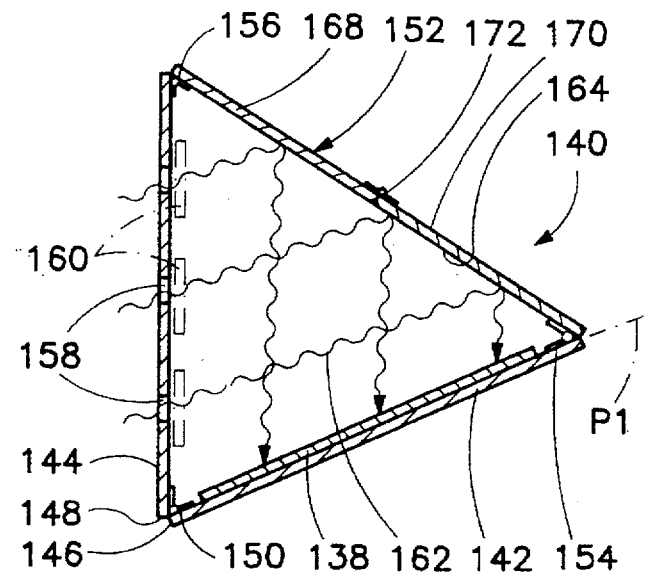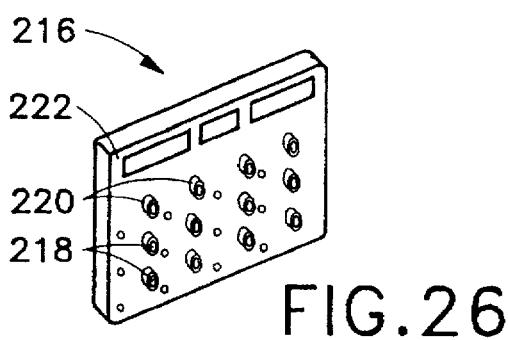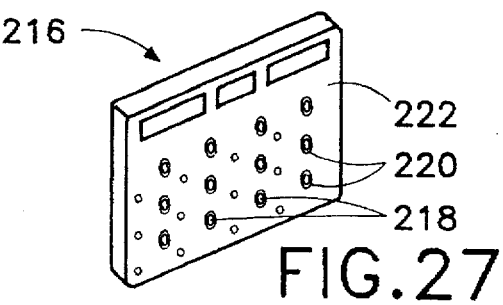

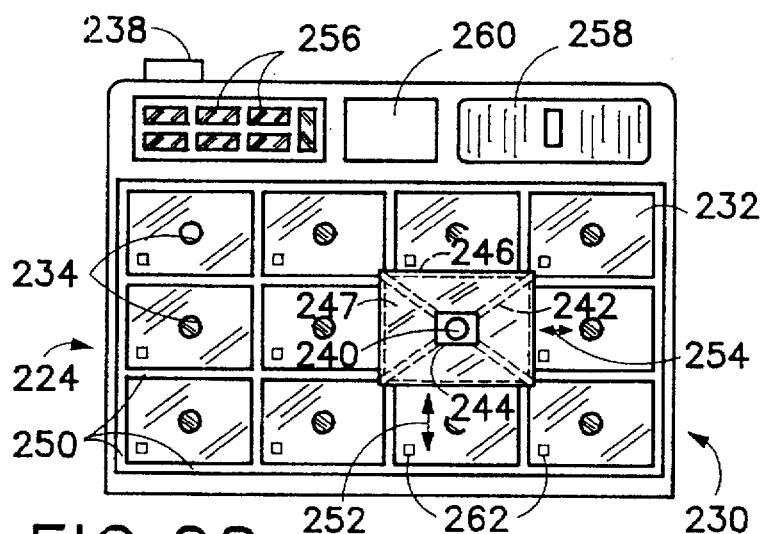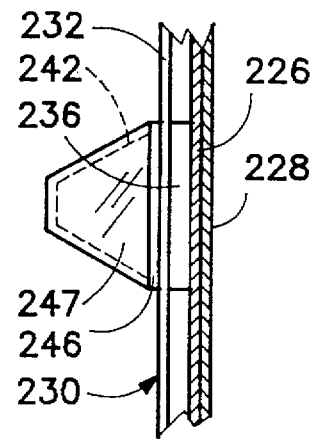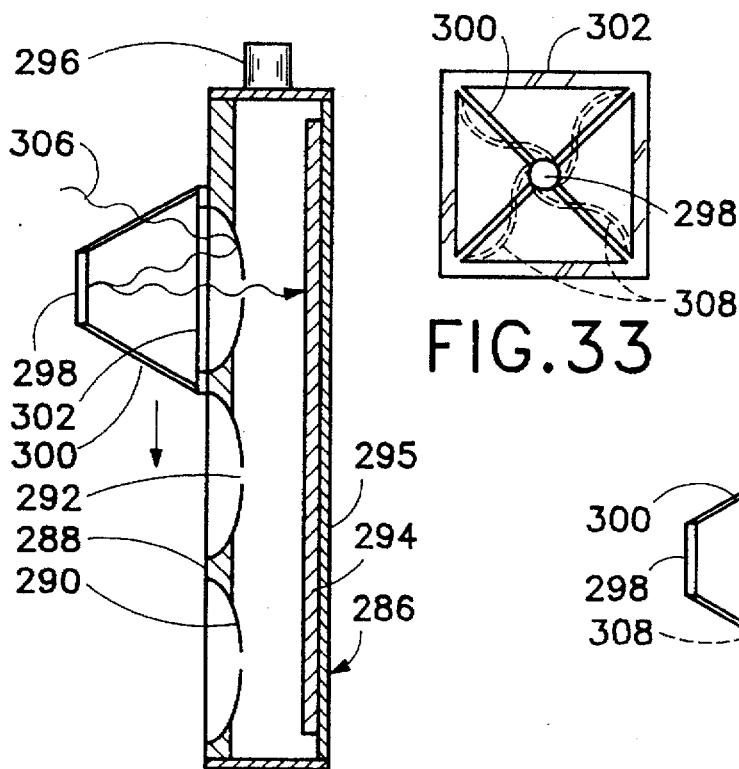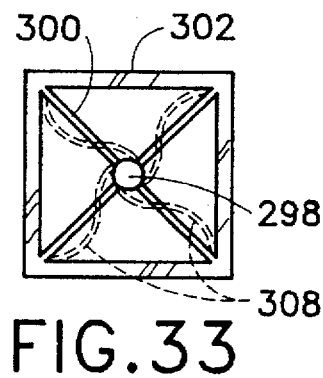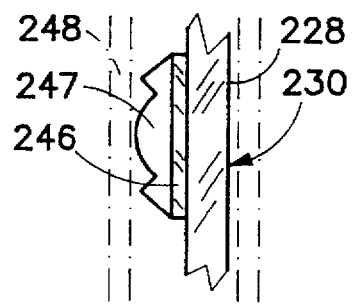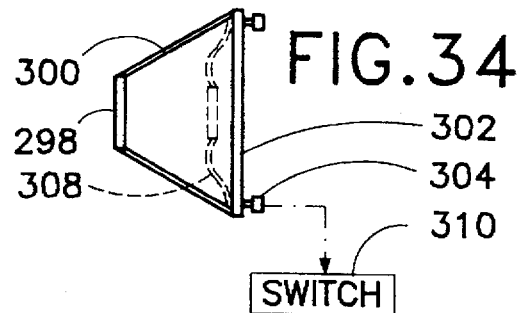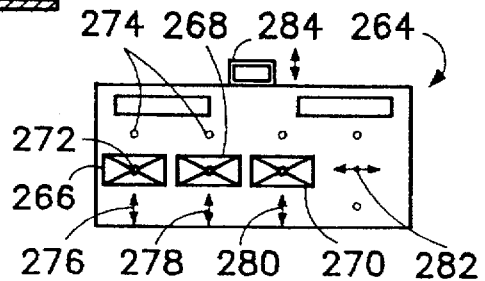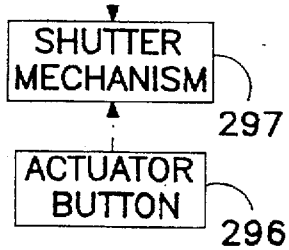

MULTIPLE AS A PHOTOGRAPHIC FILM AND ASSOCIATED CAMERA DEVICE

CROSS-REFERENCE TO RELATED APPLICATION

This applicatiion is a continuation-in-part of application Ser. No. 08/258,239 filed Jun. 10, 1994, abandoned, which in turn is a continuation-in-part of application Ser. No. 08/098,165 filed Jul. 28, 1993.

BACKGROUND OF THE INVENTION

This invention relates to photography. More particularly, this invention relates to photographic film and associated camera assemblies, as well as to a related method of taking photographs. This invention relates further to such a camera which is disposable and capable of being carried in a shirt pocket.

A recent development in photography is the disposable camera. Generally, such cameras are somewhat smaller than the conventional single lens reflex cameras preferred by afficionados. The disposable camera, however, is simple to operate. It is only necessary to aim the camera and press the shutter release button.

A problem with such disposable cameras is their size. They can be carried in a glove compartment of an automobile or in a briefcase, purse or coat pocket. However, they are too bulky to be carried in a suit or shirt pocket.

Photographic film is conventionally sold in rolls (for non-disposable cameras). Each roll is characterized by a single ASA, i.e., a single film speed or photosensitivity. Frequently, however, different photo-occasions require different film speeds for optimal picture taking. To optimize the quality of his or her results, the photographer must either carry different cameras each loaded with a different speed film or be prepared to change film. Of course, a photographer can adjust the shutter speed and aperture to compensate for a less-than-optimal film speed. However, the resulting photographs may have, for example, an undesirable graininess or blurriness of image.

OBJECTS OF THE INVENTION

An object of the present invention is to provide photographic film which overcomes the aforementioned problems as to film speed.

Another object of the present invention is to provide a camera utilizable with such film.

A further object of the present invention is to provide such a camera which is capable of being carried unobtrusively in a suit pocket or a shirt pocket.

Yet another object of the present invention is to provide such a camera which has a thickness on the order of a credit-card-size calculator.

Another, more particular, object of the present invention is to provide such a camera which is easy to use.

A further object of the present invention is to provide an associated method of taking photographs.

These and other objects of the present invention will be apparent from the drawings and detailed descriptions herein.

SUMMARY OF THE INVENTION

Photographic film comprises, in accordance with the present invention, a flexible substrate sheet divided on one side into a multiplicity of different picture areas provided with respective layers of photosensitive chemical material having a plurality of different photosensitivities. Thus, each sheet or strip of film is essentially multiple ASA film.

According to another feature of the present invention, the picture areas are all arranged in a linear array. This format is that of conventional roll film. In such a format, picture areas having layers of photosensitive chemical material of like photosensitivity may be disposed contiguously on the sheet.

Alternatively, in accordance with the present invention, the picture areas are arranged in a rectangular array. This format is utilizable with a disposable camera card pursuant to the invention. Also in this rectangular format, picture areas having layers of photosensitive chemical material of like photosensitivity may disposed contiguously in linear arrays on the sheet.

According to another feature of the present invention, the photographic film further comprises means on the film for encoding the photosensitivities of the layers in a readable format. This film-speed coding is particularly appropriate for roll film. Thus, no matter what the arrangement of the different ASA picture areas, a camera provided with an appropriate sensor (e.g., a magnetic reader) can determine the locations of picture areas of the respective film speeds or photosensitivities. A film transport mechanism in the camera can be controlled to move an unexposed picture area of an appropriate ASA to the exposure zone of the camera, either in response to a manual ASA setting or an automatic determination of optimal film speed in accordance with lighting conditions, subject distance, etc.

A camera device comprises, in accordance with the present invention, photosensitive film comprising a flexible substrate sheet divided on one side into a multiplicity of different picture areas provided with respective layers of photosensitive chemical material, the layers having a plurality of different photosensitivities. A camera frame is connected to the film for holding the film fixed in a singular position so that all the picture areas are disposed simultaneously in a plane. A plurality of lenses are mounted to the frame and disposed in a second plane spaced from the plane of the film. A shutter mechanism is mounted to the frame for enabling light transmission selectively through the lenses and onto the film. A shutter activation component is mounted to the frame and is operatively connected to the shutter mechanism for activating the shutter mechanism in response to manipulation by a user.

In accordance with another feature of the present invention, the camera further comprises a light generator mounted to the frame for generating a flash of light substantially simultaneously with an operation of the shutter mechanism. The light generator includes a light source and a concentrator for concentrating light produced by the light source, the concentrator preferentially including a Fresnel reflector disposed on one side of the light source. In addition, a Fresnel lens may be disposed on a side of the light source opposite the Fresnel reflector.

In accordance with additional features of the present invention, the lenses include lenses of different focusing powers arranged in a rectangular array, lenses of similar power being disposed in a linear array in the rectangular array. Also, picture areas on the film sheet having layers of photosensitive chemical material of like photosensitivity may be disposed contiguously in linear arrays on the sheet.

A method for taking photographs utilizes, in accordance with the present invention, photosensitive film comprising a flexible substrate sheet divided on one side into a multiplicity of different picture areas provided with respective layers of photosensitive chemical material, the layers having a plurality of different photosensitivities. The method also utilizes a plurality of lenses mounted to a frame in a plane spaced from the film. Different areas of the film are selectively and sequentially exposed via different ones of the lenses, while the film is maintained fixed relative to the lenses and in a single plane throughout the exposure step.

A camera device comprises, in another embodiment of the present invention, photosensitive film comprising a flexible substrate sheet divided on one side into a multiplicity of different picture areas provided with respective layers of photosensitive chemical material, the layers having a plurality of different photosensitivities. The film is disposed in a camera casing at least partially along a first plane, while a lens is mounted to the casing and is disposed in a second plane spaced from the first plane. A shutter mechanism is mounted to the casing for enabling light transmission through the lens and onto the film, and a shutter activation component is mounted to the casing and is operatively connected to the shutter mechanism for activating the shutter mechanism in response to manipulation by a user. The camera device also includes ASA determination componentry mounted to the casing for determining the photosensitivity of a layer of photosensitive material on a picture area of the film disposed in optical alignment with the lens.

The ASA determination componentry may include a sensor such as a magnetic detector for automatically ascertaining the photosensitivities of different picture areas on the film, for example, as the film is being transported past the sensor. To that end, the film is provided with a detectible code identifying the respective photosensitivities of the layers. This information may be used by a control unit, e.g., a microprocessor, for selectively energizing a film transport mechanism to move an unexposed film area of the desired film speed to the exposure zone of the camera. The microprocessor may be programmed to keep track of which areas of the film have been exposed. Correlatively, the film speed code may include a code for numbering the picture areas to facilitate the identification of exposed picture areas by the microprocessor. The selection of an unexposed picture area of an appropriate ASA may be implemented in response to a manual selection by an operator. In that case, an ASA setting selector or knob is provided on the camera for enabling a manual selection of film speed. Alternatively, the selection of an appropriate ASA may be implemented automatically in accordance with lighting conditions, subject distance, etc. In that case, the camera is programmed to automatically select a photosensitivity and a picture area with the selected photosensitivity prior to an activation of the shutter mechanism. The film is shifted so that the selected one of the picture areas is optically aligned with the lens prior to an activation of the shutter mechanism.

As discussed above the picture areas may be all arranged in a single linear array (film strip or roll film) with picture areas of like photosensitivity being disposed contiguously.

A camera and film in accordance with the present invention facilitates the optimalization of photographic results.

BRIEF DESCRIPTION OF THE DRAWING

FIG. 1 is a front elevational view of a pocket camera in accordance with the present invention.

FIG. 2 is a side view of the camera of FIG. 1.

FIG. 3 is a rear elevational view of the camera of FIGS. 1 and 2.

FIG. 4 is a block diagram of operative components of the camera of FIGS. 1–3.

FIG. 5 is an exploded view of the camera of FIGS. 1–3.

FIG. 6 is a front elevational view of a film sheet included in the camera of FIGS. 1–5.

FIG. 7 is partially a block diagram and partially a partial cross-sectional view of a flash unit of the camera of FIGS. 1–5.

FIG. 8 is a diagram of another flash unit utilizable in the camera of FIGS. 1–5.

FIG. 18 is a schematic isometric view of another camera in accordance with the present invention, showing the camera in an opened, use configuration.

FIG. 19 is a schematic isometric view of the camera of FIG. 18, showing an intermediate step in collapsing the device from the use configuration of FIG. 18.

FIG. 20 is a schematic side elevational view of the camera of FIGS. 18 and 19, showing the camera in a collapsed, storage configuration.

FIG. 21 is a schematic cross-sectional view of the camera of FIGS. 18–21, in the opened, use configuration, indicating different light travel paths.

FIG. 26 is a schematic isometric view of yet another collapsible camera in accordance with the present invention, showing lenses in an extended, use configuration.

FIG. 27 is a schematic isometric view of the camera of FIG. 26, showing the lenses in a retracted storage configuration.

FIG. 28 is a schematic front elevational view of another flat camera in accordance with the present invention, showing a shiftable lens holder in an extended use configuration in accordance with the present invention.

FIG. 29 is a schematic partial cross-sectional view of the camera of FIG. 28.

FIG. 30 is a schematic partial side elevational view of the camera of FIG. 28, showing the shiftable lens holder in a collapsed storage configuration.

FIG. 31 is schematic front elevational view, on a reduced scale, of another embodiment of a collapsible camera in accordance with the present invention.

FIG. 32 is a schematic cross-sectional view of yet another camera in accordance with the present invention, showing a spring loaded holder for a focusing element in the form of a mirror, showing the lens holder in an expanded, use configuration.

FIG. 33 is a schematic front elevational view of the spring loaded holder.

FIG. 34 is partially a block diagram of functional components of the camera of FIG. 32 and partially a side elevational view of the lens holder of FIG. 33.

DETAILED DESCRIPTION

Figure 9:
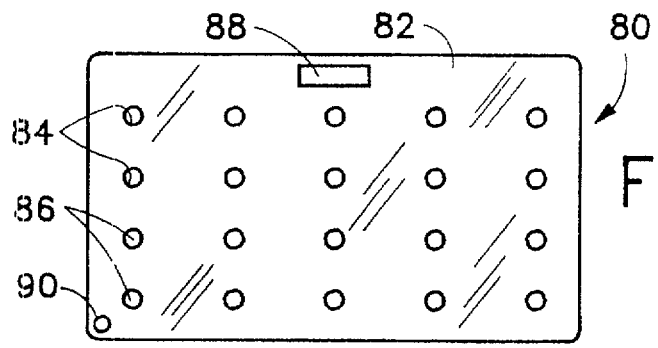
FIG. 9 is a front elevational view of another pocket camera in accordance with the present invention.

As illustrated in FIG. 1, a pocket-size camera 10 comprises a substantially flat frame or housing 12 provided along a front side or face 14 with a plurality of apertures 16 disposed in a rectangular array. Each aperture 16 is aligned with an underlying focusing element in the form of a lens 18 disposed in a plane extending parallel to the front side 14. Face 14 is also provided with a plurality of viewfinder windows 20 equal in number to apertures 16 and also disposed in a rectangular array.

Apertures 16, lenses 18, and windows 20, as well as a plurality of actuator buttons 22, define a plurality of modular, single-shot camera elements 24 disposed in a rectangular array. Each camera element 24 thus includes a respective focusing lens 18, a respective viewfinder window 20, aperture 16, and a respective actuator button 22.

Camera 10 is thin enough, as illustrated in FIG. 2, to fit into a shirt pocket or an inside suit pocket.

As depicted in FIG. 3, camera 10 has a rear side or face 26 provided with a plurality of viewfinder windows or openings 28 aligned with windows 20 and a plurality of indicator elements 30 for indicating which camera elements 24 have been used or subjected to an exposure operation by the pressing of respective buttons 22.

As further illustrated in FIG. 1, camera 10 includes in front face 14 a first additional window 32 through which solar radiation falls upon solar cells 34 (FIG. 7) and a second additional window 36 forming part of a flash unit 38 (see FIGS. 4 and 7).

As shown in FIG. 4, camera 10 further includes a plurality of shutter mechanisms 40 which are paired with respective lenses 18 on one side and respective film elements 42 on an opposite side. Generally, film elements 42 lie in a plane parallel to the plane of lenses 18.

Each shutter mechanism 40 is triggered by a respective manually operated actuator 44 such as a switch or latch in turn operated by a respective button 22. Actuators 44 are also connected to flash unit 38 for triggering the operation of that component of camera 10.

FIG. 4 schematically illustrates the path of light rays 45 traveling through lenses 18, respective shutter mechanisms 40 and onto respective film elements 42 upon the activation of respective shutter actuators 44. It is to be noted that generally only one shutter mechanism 40 will be released at a time, in the contemplation of the present invention.

FIG. 5 is an exploded view of the camera of FIGS. 1-3. Lenses 18 may be plastic Grin type lenses which are injection molded as integral parts of a frame 46 which exemplarily takes the form of a substantially planar grid. Frame 46 fits into housing 12 so as to center lenses 18 behind apertures 16.

Another frame or positioning grid 48 carries shutter mechanisms 40 which may take the form of linearly shiftable plates 50 each provided with a central aperture 52 and loaded by a compression spring 54. Actuators 44 take the form of respective catches or detents which prevent a linear motion of the respective shutter plates 50 until released by buttons 22. Three vertically aligned shutter plates at the left of frame or grid 48 have been activated or released, while the remaining shutter plates are in a prefiring position, held by actuators 44. Actuators 44 are illustrated schematically, suspended in space in FIG. 5. The actuators 44 may be connected to frame or grid 48 or even housing 12.

Behind shutter frame or grid 48 is a sheet or web 56 of photosensitive film. The different film elements or areas 42 (FIG. 4) are disposed on or are part of sheet 56. As illustrated in FIG. 6, film elements 42 are spaced from one another on film sheet 56 by non-photosensitive areas 58. Alternatively, film elements 42 may be separate webs attached to a housing back panel 60 in which apertures or openings 28 are located. Back panel 60, as well as a front panel 62 of camera 10, is provided with a thermally reflective layer (not shown) for protecting film elements 42.

Lenses 18 may include lenses of different focusing powers, with lenses of similar power being disposed in a common linear array in the rectangular array of modular camera elements 24. For example, the four columns of camera elements 24 in the array of camera 10, illustrated in FIGS. 1, 3, and 5, may have normal lenses, telephoto lenses, wide angle lenses and close up lenses, respectively. Depending on the particular shot, the user selects the next unused or available camera element 24 in the appropriate column.

Film elements or areas 42 each comprise a respective layer of photosensitive chemical material attached to sheet 56. Different film elements or areas 42 may have different photosensitivities or film speeds (ASA). Accordingly, film elements 42 have a plurality of different film speeds. In the rectangular format of film areas 42 on sheet 56, film or picture areas 42 having layers of photosensitive chemical material of like photosensitivity are disposed contiguously in linear arrays on the sheet. These linear arrays may extend horizontally so that each column of camera elements 24 in the array of camera 10, with its lenses of a single respective focusing power has a plurality of different speed film areas 42.

As illustrated in FIG. 7, flash unit 38 includes a Xenon (white light) point source 64 energized by a capacitor 66 in turn charged by solar cells 34 or a battery 68. Window 36 is a Fresnel lens, while a holographic, embossed and metallized Fresnel reflector 70 is positioned on a rear side of light source 64, opposite lens 36. Fresnel reflector 70 and Fresnel lens 36 cooperate to direct light from source 64 in a generally forward direction from camera 10.

In another embodiment of a flash unit, illustrated in FIG. 8, an elongate or linear Xenon source 72 is placed between a reflective rear surface 74 and a pair of lenticular lenses 76 and 78. Lenses 76 and 78 cooperate with one another to collimate light emanating from Xenon source 72 directly or upon reflection from surface 74.

As illustrated in FIG. 9, a pocket-size camera 80 comprises a substantially flat frame or housing 82 provided with a plurality of apertures 84 disposed in a rectangular array. As described hereinabove with reference to FIG. 1, each aperture 84 is aligned with an underlying focusing element, e.g., a lens 86. Housing 82 is also provided with a viewfinder window 88 and an actuation button 90.

Figure 10:
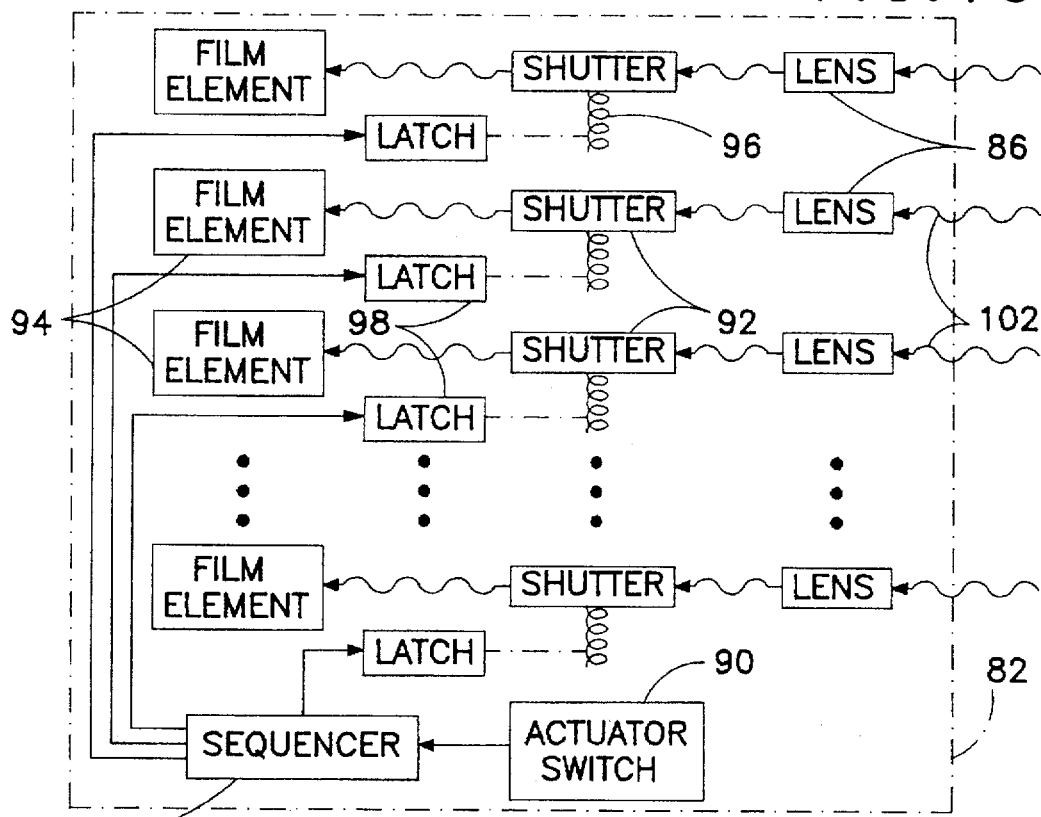
FIG. 10 is a block diagram of operative components of the camera of FIG. 9.

As shown in FIG. 10, camera 80 includes a plurality of shutter mechanisms 92 which are paired with respective lenses 86 on one side and respective film elements 94 on an opposite side. Generally, film elements 94 lie in a plane parallel to the plane of lenses 86.

Each shutter mechanism 92 is spring loaded as indicated at 96 and is triggered by a respective switch or latch 98 which is operated in response to a respective electrical signal emitted by a sequencing circuit 100. Sequencing circuit 100 is in turn triggered by actuator button or switch 90.

FIG. 10 schematically illustrates the path of light rays 102 traveling through lenses 86, respective shutter mechanisms 92 and onto respective film elements 94 upon the triggering of latches or switches 98. It is to be noted that generally only one shutter mechanism 92 will be released at a time, in a sequence determined by sequencing circuit or programmer 100.

Figure 11:
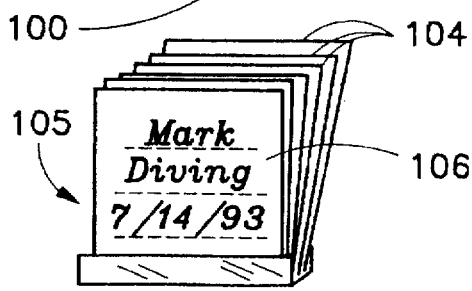
FIG. 11 is a schematic perspective view of a book of photographs taken with the camera of FIGS. 9 and 10.
Figure 12:
FIG. 12 is another schematic perspective view of the book of FIG. 11, showing use of the book to provide an illusion of movement of a photographed subject.

Film elements 94 are exposed in a sequence to photographically capture a limited motion of a subject. As illustrated in FIG. 11, photographs 104 developed from exposed film elements 94 can be bound in a small book 105 which may be labeled on a front cover 106 as to subject and date. As illustrated in FIG. 12, the bound photographs 104 may be fanned with a thumb (not illustrated) to provide an illusion of motion of the subject.

Figure 13:
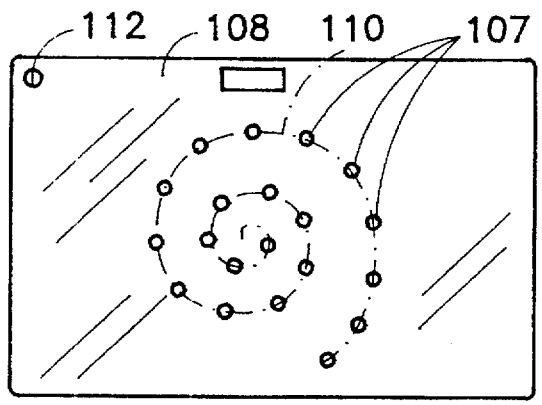
FIG. 13 is a front elevational view of yet another pocket camera in accordance with the present invention.
Figure 14:
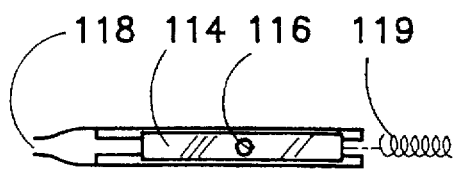
FIG. 14 is a schematic partial elevational view of a shutter mechanism in the camera of FIG. 13.

FIG. 13 depicts another arrangement of lenses 107 in a camera housing 108. Lenses 107 are disposed in an array with a spiral path 110 of sequential exposure upon the pressing of an actuator button 112. As illustrated in FIG. 14, the sequential exposing of film elements (not shown) may be implemented by an elongate shutter element 114 having a substantially centralized opening 116 and guided along spiral path 110 by tracks or rails. 118. Shutter element 114 is pulled along path 110 by a tension spring 119 upon a release thereof via an actuation of button 112.

Figure 15:
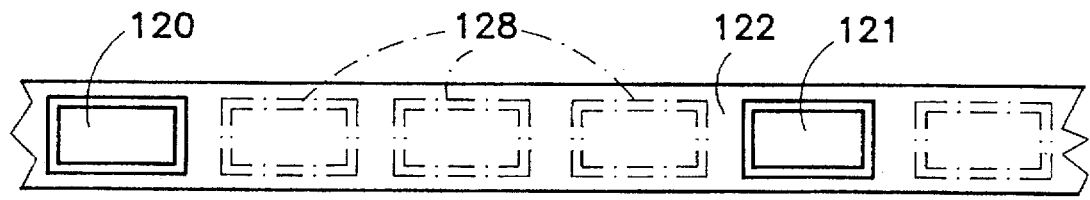
FIG. 15 is a side elevational view of a film strip constructed from a sequence of photographs taken with the camera of FIGS. 9 and 10 or FIGS. 13 and 14.
Figure 16:
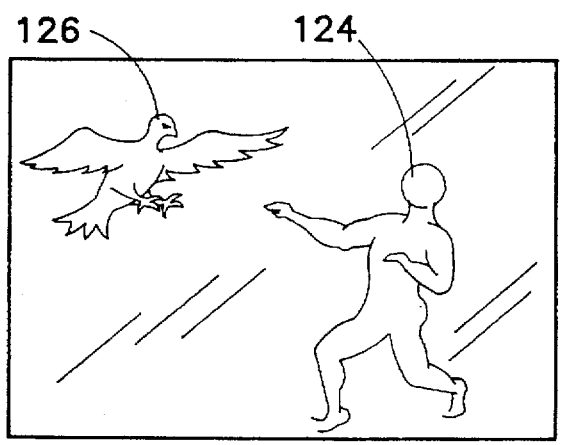
FIG. 16 is a diagram of outlines of selected objects in an exposed film element in the camera of FIGS. 9 and 10 or FIGS. 13 and 14, indicating a step in the production of the film strip of FIG. 15.
Figure 17:
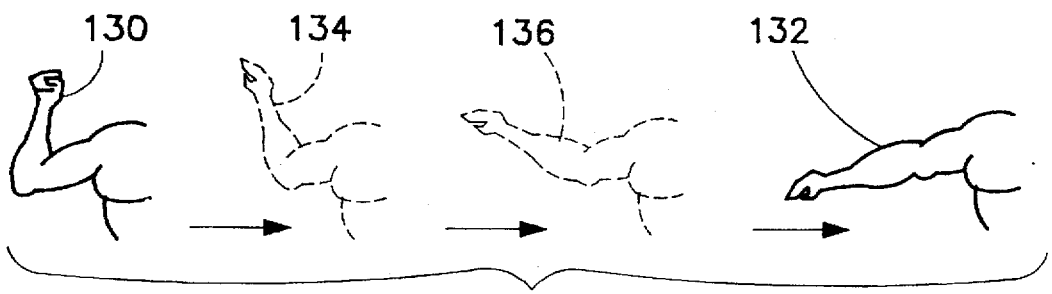
FIG. 17 is a diagram showing two interpolated arm positions in a sequence of arm motions of a subject photographed by the camera of FIGS. 9 and 10 or FIGS. 13 and 14.

As illustrated in FIG. 15, photographs or film transparencies 120 and 121 developed from respective film elements 94 of camera 80 or 108 are disposed on a film strip carrier 122. Photographs or film transparencies 120 and 121 represent successively captured positions of a moving photographed subject such as a man 124 or a bird 126 (see FIG. 16). In order to provide a continuous film strip or video, intervening frames 128 are constructed with the aid of a computer (not shown) programmed to interpolate motion by first analyzing a film according to conventional pattern recognition techniques to determine outlines for the respective subjects 124 and 126 in the developed film elements, as indicated in FIG. 16. The successive outlines for each moving subject are then analyzed by the computer to determine intervening positions of different portions of the subjects. For example, in FIG. 17, successive developed photographs may show an arm in a folded configuration 130 and an outstretched configuration 132. The computer determines from those outlines a plurality of intervening configurations 134 and 136. The computer constructs intervening frames 128 (FIG. 15) by positioning the interpolated configurations 134 and 136 of each moving subject 124 on a common background. The background is determined by overlapping the backgrounds from the different developed frames or transparencies 120 and 121.

Film elements exposed in sequence as described hereinabove with reference to FIGS. 9–14 may be processed to yield a holographic print wherein a photographed subject appears to move between different positions as captured in different film elements. Similarly, where different film elements, e.g., 42 (FIGS. 4 and 6), are exposed simultaneously, the different views can be combined to form a single three-dimensional holographic image.

As illustrated in FIGS. 18–21, a camera device comprises a photosensitive film 138 (FIG. 21) having multiple picture areas (not illustrated) and a camera casing 140 having a first panel 142 and a second panel 144 connected to one another along contiguous edges 146 and 148 via a hinge 150. Panels 142 and 144 are connected along other edges (not designated) to a third panel 152 via respective hinges 154 and 156. Film 138 is disposed in casing 140 along panel 142 so that all picture areas of the film are located essentially in a single plane P1.

Panel 144 is provided with a plurality of apertures 158 and carries one or more shutter mechanisms 160 shown diagrammatically in FIG. 21. The shutter mechanisms 160 are mounted to casing 140 for enabling light transmission selectively through apertures 158 and onto film 138 in response to manipulation by a user, thereby selectively exposing different picture areas of the film. As shown in FIG. 21, light rays 162 passing through any one aperture 158 during a photographic procedure are reflected from a mirrored surface 164 provided along an inner side of casing panel 152. Focusing elements in the form of lenses 166 are mounted to casing panel 144 for focusing incoming light onto film 138. Lenses 166 are omitted from FIGS. 20 and 21 for purposes of simplicity.

The position of panel 144 relative to panel 142, and accordingly the positions of lenses 166 relative to film 138, are variable to enable optimalization of the throw distance from the lenses to the film. Panel 152 acts as a distancing or displacement member for varying the relative positions of panels 142 and 144. To that end, panel 152 comprises a pair of panel parts 168 and 170 connected to one another via an externally mounted hinge 172. As illustrated in FIGS. 19 and 20, panel 152 folds inwardly to pivotably collapse casing 140 to a folded storage configuration shown in FIG. 20. Optimally, the storage configuration has a thickness no greater than that of several (e.g., 5) conventional credit cards stacked together. Of course, lenses 166 are closer to film 138 in the storage position of FIG. 20 than in the use configuration of FIG. 18.

The picture areas or film elements of film 138 each comprise a respective layer of photosensitive chemical material attached to a substrate sheet or to panel 142. Different picture or film areas on film 138 may have different photosensitivities or film speed (ASA). Accordingly, the picture or film areas have a plurality of different film speeds. In a rectangular format or array of picture areas on film 138, the picture or film areas having layers of photosensitive chemical material of like photosensitivity are disposed contiguously in linear arrays on the sheet.

Along opposite sides of casing 140, panels 142, 144 and 152 are connected to one another by triangular flexible opaque webs 174. A lock or latch (not shown) may be provided for temporarily maintaining the camera in the folded configuration of FIG. 20. Another lock or latch, e.g., a sliding bolt (not shown) may be provided on casing panel 152 for holding that panel in a planar configuration (FIGS. 18 and 21) during camera use.

Casing panel 144 additionally carries one or more solar cells 173 (FIG. 18) and a flash unit 175 with componentry as described hereinabove with reference to FIGS. 7 and 8.

FIGS. 22-25 depict a camera with an alternately expandable and collapsible casing 176 for providing a collapsed storage configuration (FIG. 22) capable of insertion in a shirt pocket or even a wallet and an opened use configuration which accommodates a substantial focal distance for a lens 178. Lens 178 is secured to a casing panel 180 which is rotatably mounted in an annular frame 182 in turn translatably attached to a back panel 184 of casing 176. Panel 184 carries an annular strip of photosensitive film 186 having multiple picture areas (not shown), possibly of a plurality of different film speeds. Film 186 is disposed in casing 176 so that all picture areas of the film are located essentially in a single plane P2. Panel 180 is provided with an aperture 188 (FIG. 24) aligned with lens 178 and supports a shutter mechanism 190 on a side of aperture 180 opposite lens 178. Shutter mechanism 190 is mounted to casing 176 for enabling light transmission through aperture 180 and onto film 186. Shutter activation componentry (not shown) is mounted to casing 176 and is operatively connected to shutter mechanism 190 for activating the shutter mechanism in response to manipulation by a user, thereby selectively exposing different picture areas of film 186.

Annular frame 182 is coupled to back panel 184 via a cylindrical flexible opaque web 192 made of a flexible opaque material. A helical compression spring 194 is disposed in casing 176 for pressing annular frame 182 (and accordingly front panel 180) away from back panel 184. Spring 194 thus biases casing 176 into an opened use configuration shown in FIGS. 23 and 24. A plurality of circumferentially spaced telescoping stabilizing struts 196 may be connected to annular frame 182 and back panel 184. As depicted in FIG. 24, a spring loaded latch or detect 198 is mounted to annular frame 182 (or back panel 184) for holding casing 176 in the collapsed storage configuration of FIG. 22.

Spring 194, as well as telescoping struts 196, functions as a distancing or displacement member connected to casing 176 and concomitantly to lens 178 for enabling a disposition of the lens in a collapsed storage position relative to back panel 184 and alternately in an extended use position, lens 178 being closer to film 186 in the storage position than in the use position. Upon a release of latch or detent 198, spring 194 operates to translate or shift panels 180 and 184 relative to one another.

Figure 22:
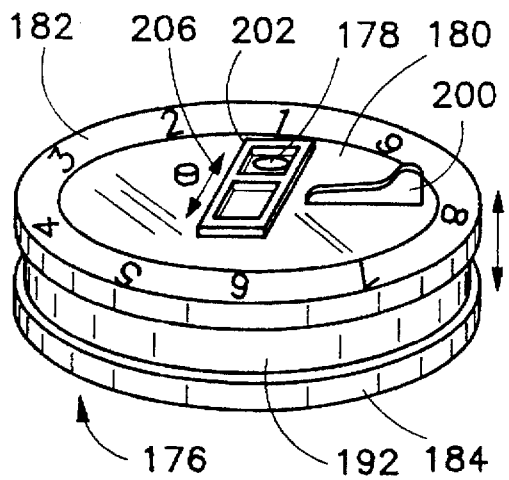
FIG. 22 is a schematic perspective view of a further camera in accordance with the present invention, illustrating the camera in a collapsed storage configuration.
Figure 23:
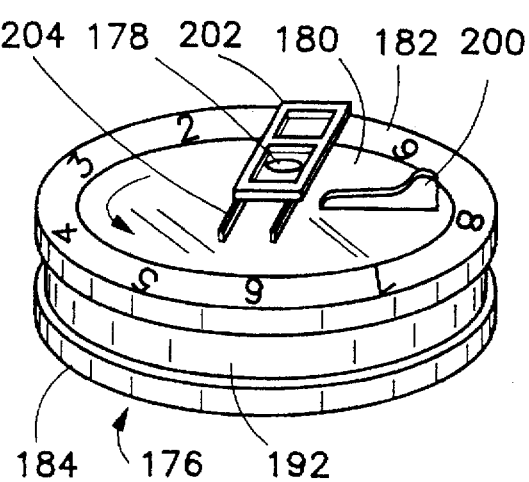
FIG. 23 is a schematic perspective view of the camera of FIG. 22, showing the camera in an opened, use configuration.
Figure 24:
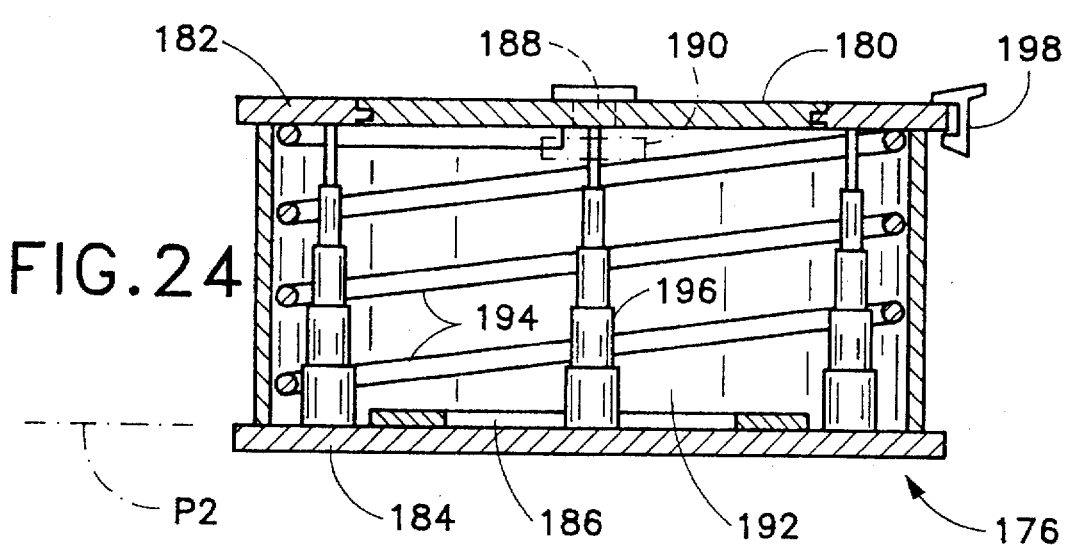
FIG. 24 is a cross-sectional view, on a larger scale, of the camera of FIG. 23.

Because panel 180 is rotatable relative to back panel 184, the camera of FIGS. 22-24 requires only one lens 178. A tab or rib 200 projects from panel 180 to facilitate a turning thereof. A view finder 202 is slidably mounted in grooves 204 (FIG. 23) in front panel 180, as indicated by a double headed arrow 206 (FIG. 22). FIG. 22 shows the storage position of view finder 202, while FIG. 23 shows an extended position thereof. In an alternative structure (not shown), the view finder consists of two parts pivotably connected to one another. One part is fixed to panel 180, while the other part is foldable into an axial position along a cylindrical outer side of annular frame 182.

Figure 25:
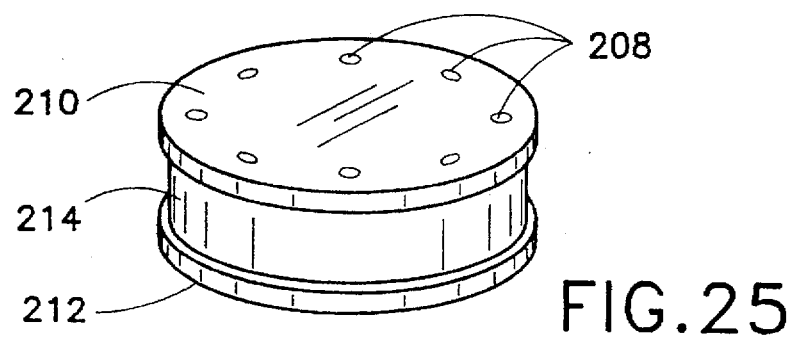
FIG. 25 is a schematic perspective view of an alternative embodiment of a collapsible camera in accordance with the present invention.

As illustrated in FIG. 25, a modified embodiment of the cylindrical camera of FIGS. 22-24 has a plurality of angularly spaced lenses 208 mounted to a front panel 210 which is translatably connected to a rear panel 212 via a cylindrical flexible opaque web 214. Separate view finders (not shown) may be provided for each lens. Alternatively, a single view finder (not shown) may be attached to a rotatable shaft (not shown).

FIGS. 26 and 27 depict another solution to the problem of increasing the spacing of focusing elements from a film surface in a flat pocket camera 216. Camera 216 has a structure substantially identical to the structure of camera 10 (FIG. 1 et seq.), except that lenses 218 are mounted to free ends of respective holders 220 which are retractably mounted to a casing 222 of camera 216. Via spring loading, holders 220 are biased into extended positions shown in FIG. 26. Holders 220 may be at least partially returned to storage positions in casing 222, as illustrated in FIG. 27, by pressing the holders inwardly. The holder may be maintained in the retracted configuration of FIG. 27 by inserting camera 216 into an appropriately sized envelope (not shown). Alternatively, each lens holder 220 may be provided with a respective releaseable detent or latch (not shown).

As illustrated in FIGS. 28-30, a camera 224 comprises photosensitive film 226 (FIG. 29) disposed along a back panel 228 of a casing 230 so that all picture areas of the film are located essentially in a single plane. The picture areas may have a plurality of different film speeds. Another major panel 232 of casing 230 is provided with a plurality of apertures 234. A shutter mechanism 236, diagrammatically indicated in FIG. 29, is mounted to casing 230 for enabling light transmission selectively through apertures 234 and onto film 226. Shutter activation componentry including a pushbutton 238 is mounted to casing 230 and is operatively connected to shutter mechanism 236 for activating the shutter mechanism in response to manipulation by a user, thereby selectively exposing different picture areas of film 226. One focusing element in the form of a lens 240 is mounted to casing 230 for focusing incoming light onto film 226.

Lens 240 is distanced or displaced from front panel 232 and accordingly from film 226 by four spring members 242 each connected at one end to a lens mounting 244 and at an opposite end to a rectangular frame or carriage 246. In an unstressed configuration, spring members 242 define a pyramidal shape by which lens 240 is held in an extended use position, shown in FIGS. 28 and 29. A pyramidally formed flexible opaque web 247 is attached to mounting 244 and carriage 246 about spring members 242. Lens 240 is collapsed to a storage position juxtaposed to panel 232 by applying an inwardly directed force (e.g., manually upon insertion of camera 224 into a camera envelope 248) which deforms spring members 242, e.g., into spiral configurations (see dashed lines in FIG. 33).

Front panel 232 is provided with a rectangular grid of grooves 250 which function as tracks for guide pins (not shown) extending from frame or carriage 246. This structure enables carriage 246 and concomitantly lens 240 to be successively shifted to positions over different apertures 234, as indicated by arrows 252 and 254. As discussed below with respect to FIG. 34, switches may be provided in casing 230 for tracking the position of carriage 246 (and lens 240) and selectively enabling the opening of a respective shutter mechanism 236 upon a pressing of button 238. Other techniques for selectively activating shutter mechanisms 236 will be available to one skilled in the photographic design arts.

Casing panel 232 additionally carries one or more solar cells 256 (FIG. 28) and a flash unit 258 with componentry as described hereinabove with reference to FIGS. 7 and 8. A view finder 260 is also provided, as well as indicators 262 of film area exposure.

As illustrated in FIG. 31, a flat camera 264 may be provided with a plurality of shiftable lens carriers 266, 268, 270 supporting lenses 272 of different powers to provide different focusing capabilities, e.g., short range, telephoto, wide angle, etc. The positions of the lens carriers 266, 268, 270 may be limited by their guide grooves or tracks (not shown). For example, lens carriers 266 and 268 may be restricted to respective columns of apertures 274, as indicated by arrows 276 and 278. Lens carrier 270 may be alignable with apertures 274 in two columns, as indicated by arrows 280 and 282. FIG. 31 also shows a pop-up view finder 284.

In another camera embodiment (not shown), each aperture is provided with its own lens and collapsible pyramidal lens holder similar to those depicted in FIGS. 28–31. In this embodiment, the lens holders are not laterally shiftable since a separate lens is provided for each aperture and each picture area of the film. The lens holders collapse as described above with reference to FIGS. 28–31 to provide a flattened configuration for the camera.

As shown in FIGS. 32–34, a camera includes a casing 286 with a front panel 288 provided with a plurality of concave reflective surfaces 290 disposed, for example, in a rectangular array and each formed centrally with an aperture 292. A photosensitive film 294 is mounted to an inner surface of a rear casing panel 295. A shutter mechanism 297 (FIG. 34) is mounted to casing 286 for selectively enabling light transmission through apertures 292 and onto film 294. Shutter activation componentry including a pushbutton 296 is mounted to casing 286 and is operatively connected to the shutter mechanism for activating the shutter mechanism in response to manipulation by a user. Focusing is implemented by reflective surfaces 290 cooperating with a mirror 298 which is spaced from front panel 288 by a plurality of linear spring members 300. Spring members 300 attach mirror 298 to a rectangular carriage 302 which is laterally shiftable relative to casing 286 by virtue of headed pins 304 (FIG. 34) which extend through grooves (like grooves 250 in FIG. 28) in front panel 288. Upon the proper positioning of mirror 298 over an aperture 292 and actuation of the shutter mechanism, incoming light rays 306 are reflected by the respective surface 290 to mirror 298 and through the respective aperture 292 onto film 294.

Spring members 300 function to distance or displace mirror 298 from front panel 288 and accordingly from film 294, thereby providing an adequate focal distance between the focusing elements (reflective surfaces 290 and possibly mirror 298) and the film. As illustrated by dashed lines 308 in FIGS. 33 and 34, spring members 300 deform upon the application of a compressive force, thereby enabling the collapse of mirror 298 to flatten the overall configuration of the camera.

The picture areas or film elements of film 294 each comprise a respective layer of photosensitive chemical material attached to a substrate sheet or to a rear panel of casing 286. Different picture or film areas on film 294 may have different photosensitivities or film speeds (ASA). In a rectangular format or array of picture areas on film 294, the picture or film areas having layers of photosensitive chemical material of like photosensitivity are disposed contiguously in linear arrays on the sheet. These linear arrays may extend horizontally so that each column of apertures 292 correspond to a plurality of different speed film areas.

As indicated in FIG. 34, switches 310 are provided in casing 286 for tracking the position of carriage 302 (and mirror 298) and selectively enabling the opening of a respective shutter mechanism 297 upon a pressing of button 296.

As discussed hereinabove with respect to FIG. 31, the camera of FIG. 32 may be provided with a single mirror 298 or with a plurality of similarly mounted mirrors. In the latter case, if the mirrors are equal in number to the reflective surfaces 290 and the apertures 292, then the mirrors are not laterally shiftable relative to the camera casing.

Figure 35:
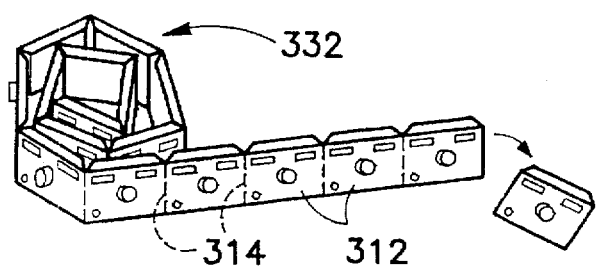
FIG. 35 is a schematic perspective view of a camera roll in accordance with the present invention.
Figure 36:
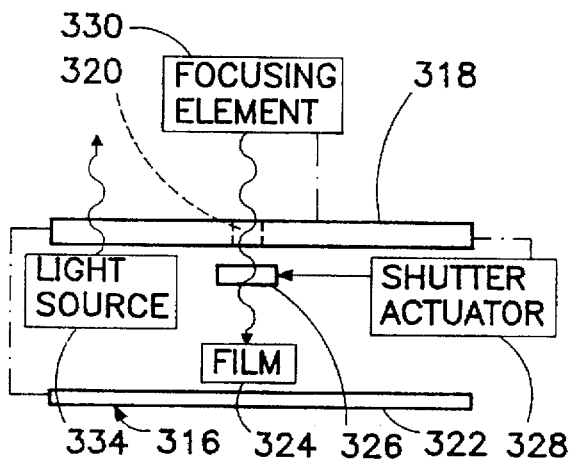
FIG. 36 is basically a block diagram of a camera included in the roll of FIG. 35.

As depicted in FIG. 35, a camera assembly comprises a plurality of single shot camera modules 312 releasably connected to each other in a linear array. The camera modules 312 are connected to one another via a plurality of frangible or severable zones, e.g., tear lines 314, between adjacent ones of the modules. As illustrated in FIG. 36, each of the modules 312 includes a respective camera casing 316 provided in a front panel 318 with an aperture 320 and on a rear panel 322 with photosensitive film 324. A shutter mechanism 326 is mounted to casing 316 for enabling light transmission through aperture 320 and onto film 324. Shutter actuation componentry 328 is mounted to casing 316 and is operatively connected to shutter mechanism 326 for activating the shutter mechanism in response to manipulation by a user, thereby selectively exposing different picture areas of the film. A focusing element 330 in the form of a lens or a mirror cooperating with a concave reflective surface (not shown) on the front side of front panel 318 is provided for focusing incoming light rays on film 324. If a lens, focusing element 330 may be alternately extendible and collapsible by any of the techniques described hereinabove.

It is to be noted that camera modules 312 may be single shot cameras, as shown in FIGS. 35 and 36, or, alternatively, multiple shot cameras, as discussed above, for example, with reference to FIG. 1, 18, 26, or 28. The linear array of camera modules 312 may be coiled into a roll 332, as depicted in FIG. 35. Each camera module 312 may be further provided with a light source 334 as discussed above with respect to FIGS. 7 and 8.

Figure 37:
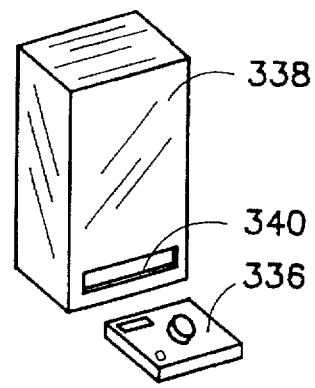
FIG. 37 is a schematic perspective view of a dispenser pack for flat cameras in accordance with the present invention.

As illustrated in FIG. 37, a flat camera 336 as described hereinabove may be stored in a box 338 provided with a slot 340 for dispensing a plurality of such cameras in sequence. Slot 340 may be temporarily covered, prior to use, with a releaseable adhesive strip (not shown).

Figure 38:
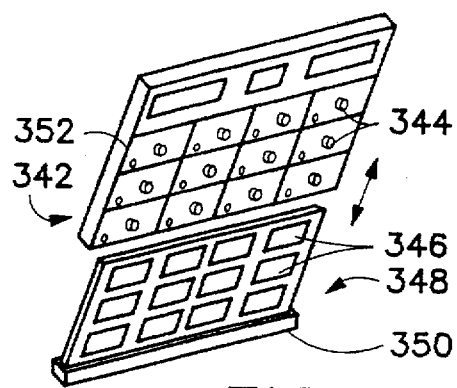
FIG. 38 is a schematic exploded view of a flat camera with a removable film cartridge, in accordance with the present invention.

FIG. 38 depicts a flat camera 342 with multiple focusing elements 344 and apertures (not designated) for exposing different picture areas 346 of a photosensitive film 348. Film 348 is provided as a cartridge and is attached at least along one edge to a holder 350 which is removably attachable to camera casing 352, whereby the film may be removed for development and replaced with a similar cartridge of unexposed film. A releaseable latch or detent (not shown) may be provided for releaseably securing holder 350 to camera casing 352. Such a latch or detent may simply take the form of a cofunctioning snap lock knob and recess.

Figure 39:
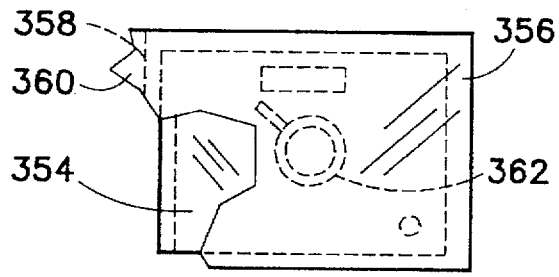
FIG. 39 is a schematic rear elevational view, partly broken away, of a disposable flat camera assembly in accordance with the present invention.
Figure 40:
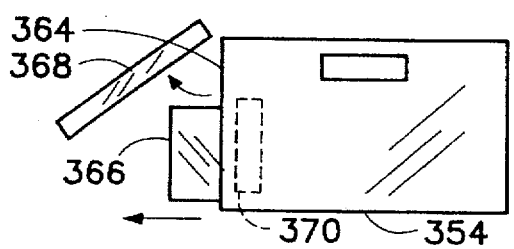
FIG. 40 is a schematic rear elevational view of a camera portion of the assembly of FIG. 39.

As shown in FIGS. 39 and 40, a disposable camera assembly includes a camera 354 stored in an envelope or bag 356 provided with a score line 358 whereby an edge portion 360 of the envelope may be severed and the camera removed from the envelope. Camera 354 may include a focusing element 362 or multiple focusing elements (not shown in FIGS. 39 and 40). Camera 354 itself is provided with a frangible zone or tear line 364. Upon a completed exposure of a film sheet 366 in camera 354, camera 354 is severed along line 364 to remove an edge portion 368. Subsequently, film sheet 366 is drawn from the camera. During the withdrawal of film sheet 366, developing chemicals from a storage reservoir 370 are automatically deposited upon the film for instantly developing the exposed film.

Figure 41:
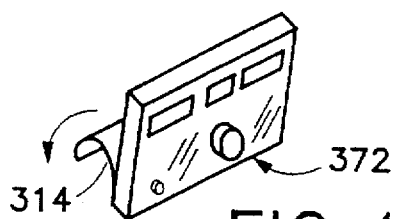
FIG. 41 is a schematic front perspective view of another flat camera in accordance with the present invention, showing a flexible rear panel partially removed.
Figure 42:
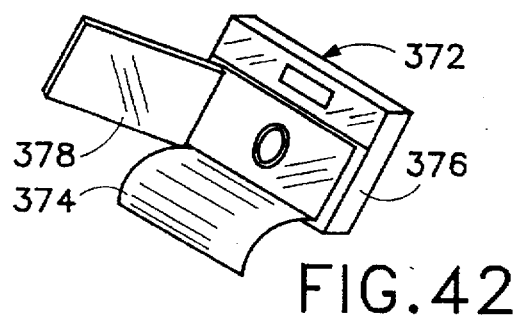
FIG. 42 is a schematic rear perspective view of the camera of FIG. 41, showing removal of a film sheet in accordance with the present invention.

In an alternative embodiment of a disposable camera with instant film development, illustrated in FIGS. 41 and 42, a camera casing 372 includes a releasable rear panel 374 attached, e.g., via adhesive, to a frame 376 of casing 372. Upon the exposure of a film sheet 378 which is disposed in camera casing 372, rear panel 374 is peeled away and film sheet 378 removed. As in conventional instant photography, the removal of the exposed film initiates the development process.

Figure 43:
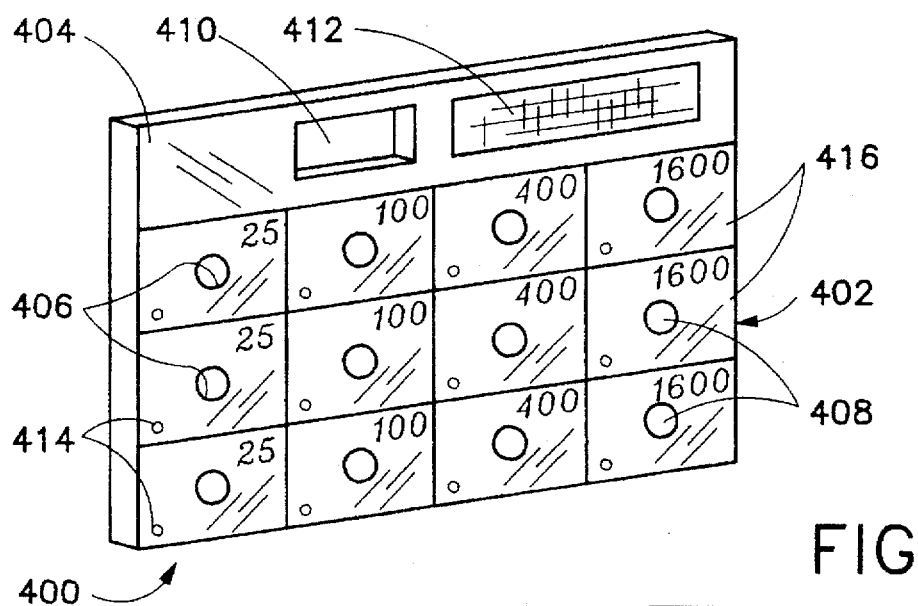
FIG. 43 is a schematic front perspective view of a camera card with multiple ASA film in accordance with the present invention.

As illustrated in FIG. 43, a pocket- or wallet-size camera card 400 comprises a substantially flat frame or housing 402 provided along a front side or face 404 with a plurality of apertures 406 disposed in a rectangular array. Each aperture 406 is aligned with an underlying focusing element in the form of a lens 408 disposed in a plane extending parallel to the front face 404. Frame 402 is also provided with a viewfinder window 410 and a substantially flat light generating flash component 412 as described above.

Apertures 406 and lenses 408, as well as a plurality of actuator buttons 414, define a plurality of modular, single-shot camera elements 416 disposed in a rectangular array. Each camera element 416 thus includes a respective focusing lens 408, aperture 406, and a respective actuator button 414. Camera 400 is thin enough to fit into a shirt pocket or an inside suit pocket or in a billfold or wallet.

As further illustrated in FIG. 43, camera elements 416 each correspond to a respective film area (not shown) of a respective photosensitivity or ASA value. As indicated by ASA numbers "25," "100," "400," and "1600" on face 404 camera elements 416 having film areas of like photosensitivities are located in linear arrays (e.g., columns). The user simply uses a camera element 416 having an unexposed film area of desired photosensitivity.

Figure 44:
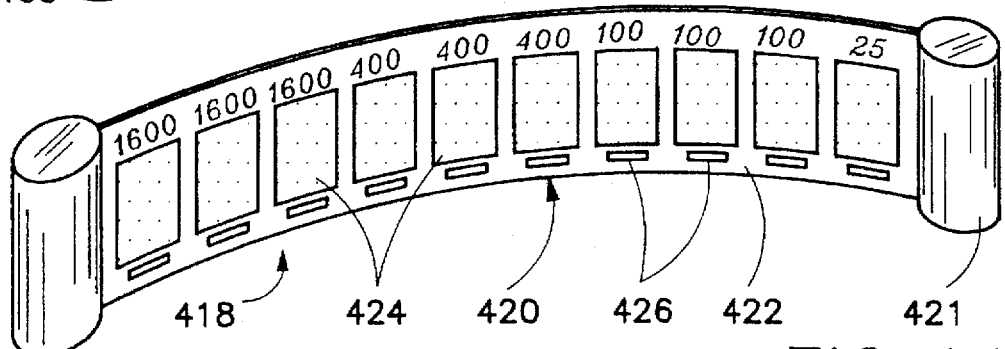
FIG. 44 is a schematic perspective view of a roll of multiple ASA film in accordance with the present invention.

As illustrated in FIG. 44, a photographic film cartridge 418 includes a strip of film 420 attached at at least one end to a film canister or container 421. Film strip 420 comprises a flexible substrate sheet 422 divided on one side into a multiplicity of different picture areas 424 provided with or defined by respective layers of photosensitive chemical material having a plurality of different photosensitivities. Thus, each film strip 420 is essentially multiple ASA film.

As further illustrated in FIG. 44, picture areas 424 are all arranged in a linear array with picture areas of like photosensitivity being disposed contiguously on substrate sheet 422.

Figure 45:
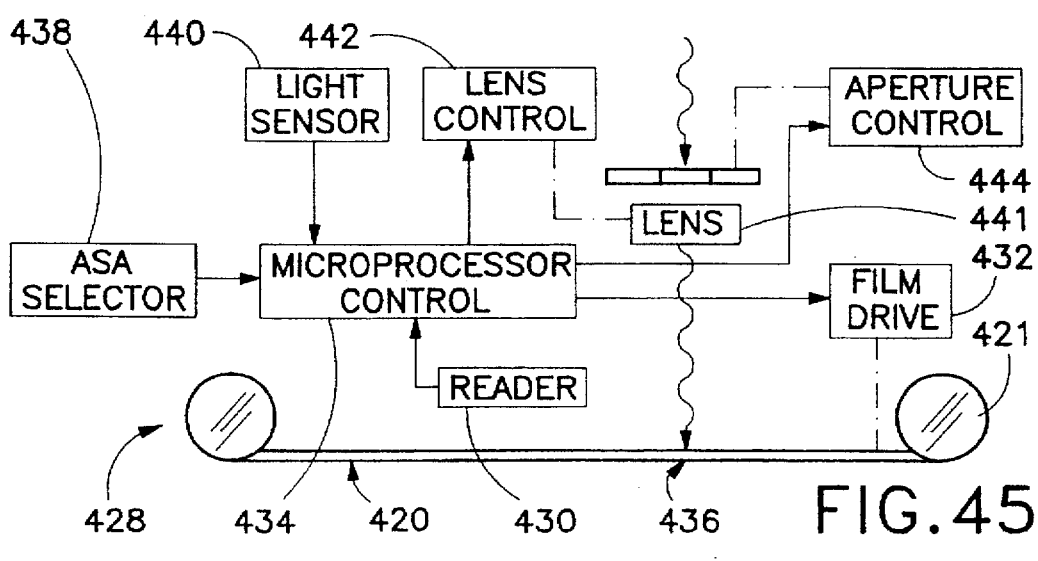
FIG. 45 is essentially a block diagram of a camera for use with the multiple ASA film of FIG. 44.

As indicated in FIG. 44, film strip 420 is provided with detectible code 426 on substrate sheet 422 for encoding the photosensitivities of the different layers or picture areas in a readable format. Thus, no matter what the arrangement of the different ASA picture areas 424, a camera 428 (FIG. 45) provided with an appropriate sensor, e.g., a magnetic reader 430, can determine the locations of picture areas 424 of the respective film speeds or photosensitivities "25," "100," "400," and "1600," or, alternatively, can determine the film speeds or photosensitivities of the different picture areas 424. A film transport mechanism 432 in camera 428 can be controlled by a microprocessor 434 or other programmer to move an unexposed picture area 424 of an appropriate ASA to an exposure zone 436 of camera 428, either in response to an ASA setting selected manually via an actuator knob 438 or an automatic determination of optimal film speed in accordance with lighting conditions as detected by a light sensor 440, subject distance, etc. As in other automatic or semi-automatic cameras, microprocessor 434 may determine focusing of a lens 441 via a focus control 442 and aperture via an aperture control 444. Microprocessor 434 includes a memory (not separately shown) for storing in encoded form which picture areas 424 of film strip 420 have been exposed. Codes 426 may include an identification of the respective picture film area, e.g, a number designating the respective location of the picture area on the strip 420.

Although the invention has been described in terms of particular embodiments and applications, one of ordinary skill in the art, in light of this teaching, can generate additional embodiments and modifications without departing from the spirit of or exceeding the scope of the claimed invention. It is to be noted, for example, that many different, but equivalent, shutter mechanisms are possible in accordance with the present invention. Instead of being mechanical, shutter mechanisms 40 may be electronic, without moving parts, such as cholesteric diodes, numatic crystals, or PZT (lead zirconium tantanate) crystals. An alternative mechanical shutter system may be gravity activated. Instead of a spiraling shutter element 114, camera housing 108 may be provided with a shutter wheel (not shown) having an elongate substantially radially oriented straight or arcuate slot for successively opening different lenses in a predetermined sequence alternating between inner and outer tracks of a spiraling or concentric lens array.

Accordingly, it is to be understood that the drawings and descriptions herein are profferred by way of example to facilitate comprehension of the invention and should not be construed to limit the scope thereof.

What is claimed is:

1. Photographic film comprising a flexible substrate sheet divided on one side into a multiplicity of different picture areas provided with respective layers of photosensitive chemical material, each of said picture areas being characterized by a single respective photosensitivity, said picture areas having a plurality of different photosensitivities.

2. The film defined in claim 1 wherein said picture areas are all arranged in a linear array.

3. The film defined in claim 2 wherein picture areas of like photosensitivity are disposed contiguously on said sheet.

4. The film defined in claim 1 wherein said picture areas are arranged in a rectangular array.

5. The film defined in claim 4 wherein picture areas of like photosensitivity are disposed contiguously in linear arrays on said sheet.

6. The film defined in claim 1, further comprising means on said film for encoding the photosensitivities of said layers in a readable format.

7. A camera device comprising:

photosensitive film comprising a flexible substrate sheet divided on one side into a multiplicity of different picture areas provided with respective layers of photosensitive chemical material, each of said picture areas being characterized by a single respective photosensitivity, said picture areas having a plurality of different photosensitivities;

frame means connected to said film for holding said film fixed in a singular position so that all said picture areas are disposed simultaneously in a first plane;

a plurality of lenses mounted to said frame means and disposed in a second plane spaced from said first plane;

shutter means mounted to said frame means for enabling light transmission selectively through said lenses and onto said film; and shutter activation means mounted to said frame means and operatively connected to said shutter means for activating said shutter means in response to manipulation by a user.

8. The device defined in claim 7, further comprising light generating means mounted to said frame for generating a flash of light substantially simultaneously with an operation of said shutter means.

9. The device defined in claim 8 wherein said light generating means includes a light source and concentrator means for concentrating light produced by said light source, said concentrator means including a Fresnel reflector disposed on one side of said light source.

10. The device defined in claim 9 wherein said concentrator means includes a Fresnel lens disposed on a side of said light source opposite said Fresnel reflector.

11. The device defined in claim 7 wherein said lenses include lenses of different focusing powers.

12. The device defined in claim 11 wherein said lenses are arranged in a rectangular array, lenses of similar power being disposed in a linear array in said rectangular array.

13. The device defined in claim 7 wherein picture areas having layers of photosensitive chemical material of like photosensitivity are disposed contiguously in linear arrays on said sheet.

* * * * *